United States Patent [19]

Martin

[11] Patent Number: 4,923,368
[45] Date of Patent: May 8, 1990

[54] LIQUID DRIVEN TURBINE

[75] Inventor: George R. Martin, Dunedin, New Zealand

[73] Assignee: Martin Research & Development Ltd., Dunedin, Netherlands

[21] Appl. No.: 368,885

[22] Filed: Jun. 20, 1989

Related U.S. Application Data

[63] Continuation of Ser. No. 90,759, Aug. 28, 1987, abandoned.

[51] Int. Cl.⁵ .............................................. F01D 1/02
[52] U.S. Cl. .................................... 415/202; 415/92; 416/197 A
[58] Field of Search ............... 415/6, 202, 92; 416/197 A, 197 B, 197 R; 417/405

[56] References Cited

U.S. PATENT DOCUMENTS

| | | | |
|---|---|---|---|
| 1,015,858 | 1/1912 | Verde | 416/197 |
| 1,108,700 | 8/1914 | Christoffel | 416/197 R |
| 1,331,110 | 2/1920 | Hutchens | 415/202 |
| 1,379,515 | 5/1921 | Bell | 417/505 |
| 1,578,835 | 3/1926 | Kothe | 416/197 A |
| 1,798,646 | 3/1931 | Anderson | 417/403 |
| 3,381,618 | 5/1968 | Napolitano | 415/11 |
| 4,043,702 | 8/1977 | Gotti | 415/202 |
| 4,184,584 | 1/1980 | Dehlen | 415/6 |
| 4,218,176 | 8/1980 | Gawne | 415/202 |
| 4,246,753 | 1/1981 | Redmond | 60/398 |
| 4,352,025 | 9/1982 | Troyen | 290/54 |
| 4,467,217 | 8/1984 | Roussey | 416/197 A |

FOREIGN PATENT DOCUMENTS

| | | | |
|---|---|---|---|
| 348721 | 5/1937 | Italy | 415/202 |
| WO81/03359 | 11/1981 | PCT Int'l Appl. | |
| 1520006 | 8/1978 | Sweden | |
| 306656 | 2/1929 | United Kingdom | 415/202 |
| 2016090 | 9/1979 | United Kingdom | |
| 2016909 | 9/1979 | United Kingdom | |
| 2072758 | 10/1981 | United Kingdom | |

OTHER PUBLICATIONS

A Manual of Mechanical Movements, by Will M. Clark (pp. 146 and 147), no date given.
"The Elements of Mechanics and Mechanisms", by F. J. Camm, pp. 123 and 124.

Primary Examiner—Robert E. Garrett
Assistant Examiner—Therese M. Newholm
Attorney, Agent, or Firm—Fleit, Jacobson, Cohn, Price, Holman & Stern

[57] ABSTRACT

The invention relates to a water driven turbine. The turbine has a central drum rotatable on a horizontal shaft, the drum having a series of buckets about its periphery, the outer lips of each bucket being such as to delay discharge of water from each bucket until the bucket has a almost reached bottom dead center. The turbine has an inlet with a relatively narrow upstream opening and a relatively broad downstream opening, the inlet spreading the flow of water along substantially the length of each bucket. The turbine may be coupled to a pump which pumps water from a reservoir of water that has passed through the pump. Delivery of water can be achieved to unexpectedly high levels using the turbine/pump combination.

16 Claims, 4 Drawing Sheets

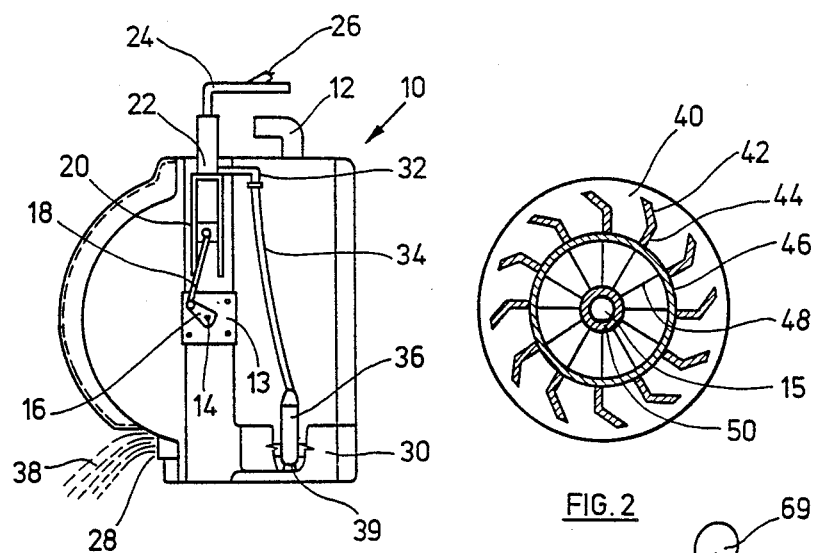
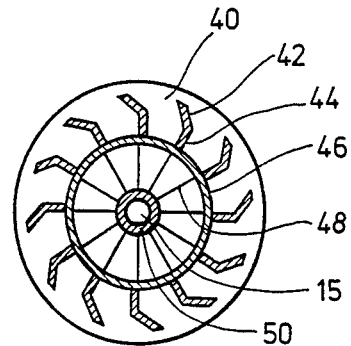
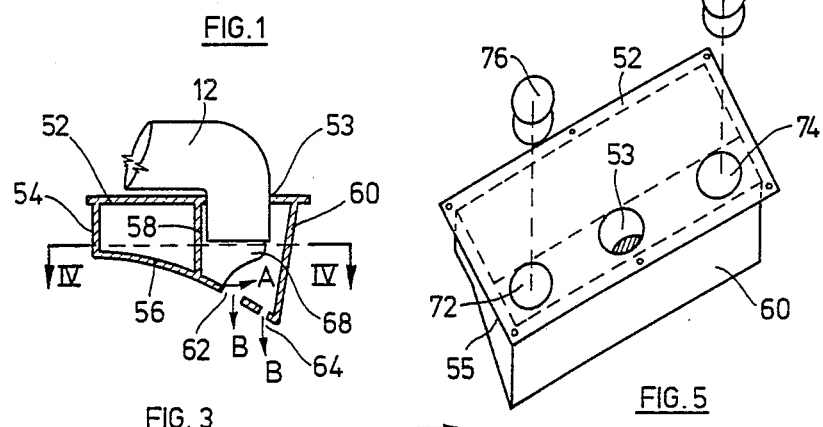
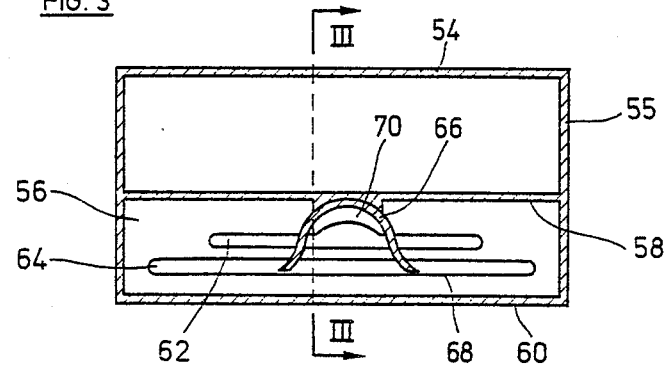
FIG. 1  FIG. 2  FIG. 3  FIG. 5  FIG. 4

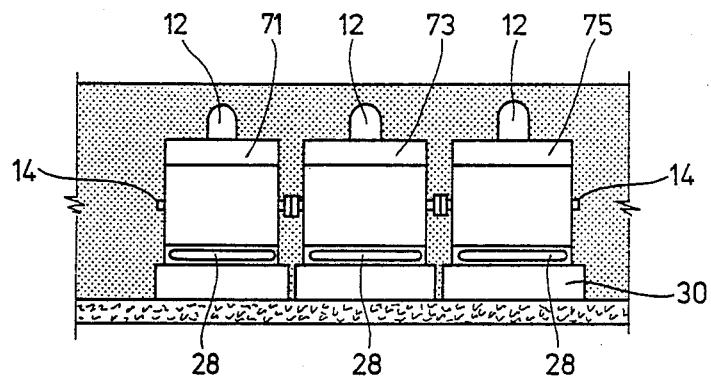
FIG. 6
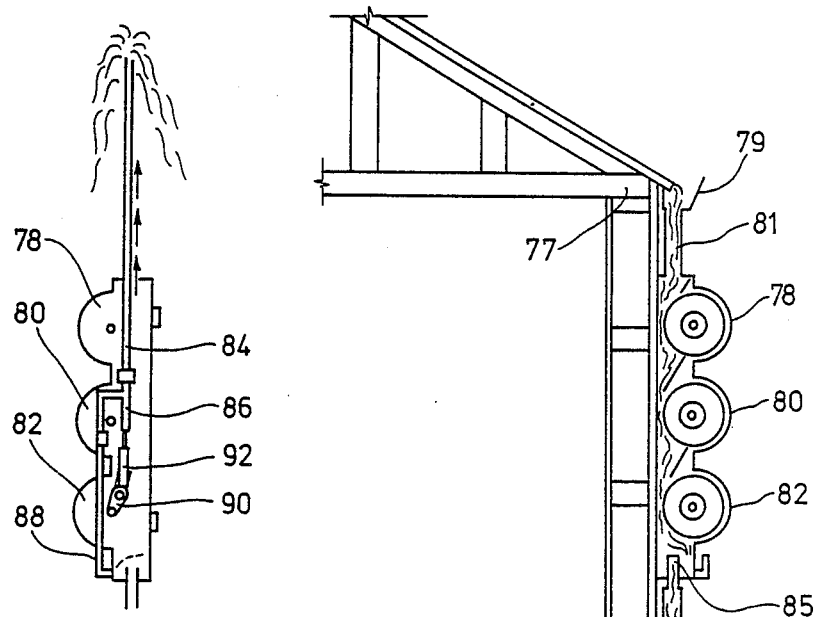
FIG. 7B
FIG. 7A

LIQUID DRIVEN TURBINE

This is a continuation of application Ser. No. 090,759, filed Aug. 28, 1987 which in turn is abandoned.

BACKGROUND OF THE INVENTION

1. Field of the Invention

This invention relates to a water driven turbine. The turbine is particularly useful for pumping water from sources providing only a low head. It can be used for other applications known to those skilled in the art.

2. Description of the Prior Art

Water wheels have been known and used for centuries. A number of applications have been devised for the use of water wheels. A conventional wheel is of a relatively large diameter with a relatively short axis of rotation. The blades extend radially outwardly from near the center. Such blades are inefficient in operation in comparison with the turbine of the present invention.

U.S. Pat. Nos. 1,015,858; 1,108,700; 1,798,646; 3,381,618; 4,043,702; 4,246,753 and 4,352,025 all relate to devices having a common origin in the water wheel. These represent the most relevant prior art known to the applicant. None shows the same features of construction in combination as in the invention described in this application.

BRIEF SUMMARY OF THE INVENTION

It is an object of this invention to provide a water wheel turbine of a mechanically simple design which allows the efficient use of the weight of water rather than speed to achieve sufficient momentum to turn the water wheel at optimum rate.

Accordingly the invention may be said broadly to consist in a water driven turbine comprising:
 a central shaft,
 a drum co-axial and rotatable with said shaft,
 buckets fixed to the periphery of said drums, the alignment of each bucket being such as to delay discharge of water therefrom until before, but substantially close to bottom dead center and,
 inlet means having a relatively narrow intake end to receive a flow of water and having a relatively wide outlet end to spread the flow and direct the water into each bucket substantially along the length thereof whereby in use the drum and shaft are rotated by the water falling into the buckets.

Preferably the turbine is substantially cylindrical and the diameter of the drum is substantially one half to three quarters of the diameter of the circumference defined by the outer lips of the buckets.

Preferably each said bucket is defined by the outer surface of the drum, a disc extending radially outwardly at either end thereof and connecting inner and outer blade portions extending axially between each of the discs and substantially radially outwardly from said drum.

Preferably the blade portions are flat.

Preferably the plane of the inner part of each blade lies along a radius of said drum.

Preferably the plane of the outer blade intersects the plane of the inner blade part at an angle of substantially 120°.

Preferably there is provided a lip blade portion at the radially outer edge of a the outer blade, said lip extending axially between each of the discs.

Preferably the plane of the lip intersects the plane of the outer blade at an angle of substantially 120°.

Preferably said outer blade part is wider than viewed in end elevation than either of the inner blade part and said lip portion. Preferably there are provided three the inlet means into said turbine.

Preferably the planes of said inner blades extending radially from said drum intersect at angles of substantially 30°.

Preferably the inlet is provided at its water discharge end with deflecting means to direct the flow of water in a substantially flat flow.

Preferably the deflecting means comprises a lip at the discharge end thereof and complementary means to direct the flow of water from said lip substantially radially inward toward the opening of each the bucket.

Preferably the turbine is provided with a casing.

Preferably the casing is closely fitting over said buckets.

Preferably at least one end of the shaft is provided with a crank drivingly connected to a reciprocating pump, the source for water pumped by the pump being a reservoir near the discharge point for water driving the turbine.

Preferably there is provided a baffle between the point of discharge of water from said turbine and the point of intake of water into the pump to reduce cavitation in water being pumped.

BRIEF DESCRIPTION OF THE DRAWINGS

The invention may be more fully understood by the following detailed description with reference to the accompanying drawings wherein:

FIG. 1 is an end elevational view of a turbine according to the invention with a protective side housing removed from the reciprocating pump and a portion of the lower part of the casing broken away to show the intake reservoir;

FIG. 2 sectional view of the drum and buckets of a first construction;

FIG. 3 is the cross sectional view taken along line III—III in FIG. 4 of the cover/inlet portion of the apparatus.

FIG. 4 is the section view IV—IV in FIG. 3;

FIG. 5 is a perspective view of the cover/inlet of FIGS. 3 and 4.

FIG. 6 is a front elevational view of three turbines according to the invention having the ends of their driven shafts interconnected.

FIGS. 7A and 7B are side elevational views of three turbines mounted one above the other and connected with the spouting of a building to use rainwater to drive the turbines;

DETAILED DESCRIPTION OF THE INVENTION

Figure 8:
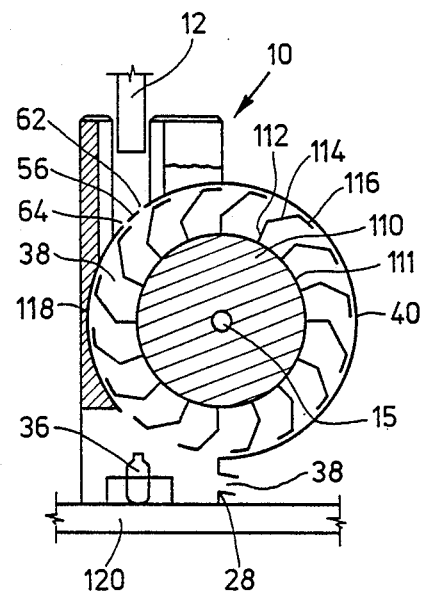
FIG. 8 is a cross-sectional view of an alternative embodiment of the invention showing turbine buckets of another construction.

Referring to FIG. 2 the driven component of the turbine of the invention comprises a pair of end discs 40 mounted at either end of a drum 46. Buckets of one embodiment are formed by means of flat blades comprising an inner portion 44 and an outer portion 42. Discs 40 extend radially beyond the lips of outer portions 42 in a preferred embodiment to reduce spillage of water out of the buckets. In the embodiment illustrated the plane of inner portion 44 lies in a radius of the drum. Blade portion 42 extends at an angle of approximately 120° to blade portion 44. There are a series of spokes 48 which extend from a bushing 50 around central shaft 15 to support the drum 46. Other suitable constructions can be employed to maintain the drum to be rotatable with central shaft 15. Constructions using blades which are curved to form buckets may be used. A particularly preferred embodiment is described below in relation to FIG. 8. As will be discussed below the buckets are designed to provide the maximum torque in rotating shaft 15.

The turbine is provided with a casing 10 as illustrated in FIG. 1. End 14 of shaft 15 is mounted in a bearing block 13. A crank 16 is mounted on end 14 and joined by a connecting rod 18 to a slide piece 20. Slide piece 20 operates the piston rod of a reciprocating pump 22. A pipe 24 leads out of pump 22. A non-return valve 26 is provided in pipe 24.

At the bottom of casing 10 at the lower left hand side there is provided an outlet 28 from which water 38 is discharged in operation. The inlet for pump 22 is provided by a first elbowed pipe 32, a tubing 34 and an inlet 36 which is open at its bottom end. A suitable filter 39 may be provided in inlet 36. In one embodiment metal wool made of a suitable non-corrosive metal can be used.

Inside the bottom of casing 10 there is a defined reservoir 30, the depth of which is determined by the bottom level height of opening 28. Reservoir 30 extends to one end of the casing to provide a reservoir for intake 36. A baffle plate may be provided between the main reservoir and the side reservoir 30. This baffle can reduce cavitation during use reducing the incidence of bubbles in tubing 34. In one preferred embodiment a pump and reservoir are provided at each end of the casing.

In the top of the casing 10 there is provided a rectangular opening into which fits the cover/inlet member illustrated in FIGS. 3, 4, and 5. The cover/inlet member comprises a top portion 52 having a central inlet hole 53. There are also provided front wall 54, side wall 55, rear wall 60, a central gusset 58 and a curved bottom wall 56 having slots 62 and 64 passing therethrough. At the bottom of opening 53 above one wall 56 there is provided a deflector 66 having a pair of folded back ends 68 and a lip portion 70. Inlet pipe 12 fits into opening 53.

Referring to FIG. 5 there may also be provided a pair of auxilliary openings 72 and 74 and caps 76 and 69 for use when only one source of water is provided.

Referring to FIG. 6 there are illustrated three turbines 71, 73 and 75. Each has an inlet 12 and discharge opening 28. Each of the abutting ends 14 of shafts 15 of the three turbines are connected to each other.

Illustrated in FIGS. 7A and 7B are three turbines 78, 80 and 82 mounted one above the other on the side of a building 77 draining water from the building. Spouting 79 empties into downpipe 81 which feeds in turn each of the turbines 78, 80 and 82. A priming reservoir is provided at the bottom of turbine 82 and this is emptied by drainpipe 85 into sewer pipe 87. As illustrated in FIG. 7B a crank 90 may be provided on the bottom turbine 82 connected by a connecting rod 92 to a reciprocating pump 86. An intake priming pipe 88 is connected to the reservoir at the bottom of turbine 82.

A discharge pipe 84 leads from pump 86.

The drive shafts of each of the three turbines 78, 80 and 82 may be interconnected by chain and sprocket or the like gearing means so that the torque of the three turbines is combined into the the drive of the bottom turbine 82.

The operation of the embodiment illustrated in FIGS. 1 to 5 will now be described. A source of water is provided to conduit 12. In one operative embodiment a stream is dammed to provide a head of approximately 600 mm feeding a circular pipe 12 of approximately 100 mm diameter. Water discharged from the mouth of pipe 12 contacts the deflector 66 above slots 62 and 64. Some of the flow drops directly through slot 62 and a lesser amount directly through slot 64. Another portion of the stream of water is deflected by lip 70 outwardly in the direction of arrow A along the deflector 66 and past the end portion 68 against the inside of wall 66 and back down slot 64 as shown by arrow B. The stream of water passing through the slots 62 and 64 is spread substantially along the length of the buckets immediately below. It will be seen from FIG. 2 that water does not begin to discharge from the buckets until the turbine has rotated to approximately 4 to 5 o'clock. This allows sufficient torque to be developed to rotate shaft 15 at an optimum efficiency.

It has been observed that with a head of 600 mm and a reciprocating pump having a bore of 38.1 mm water can be raised to a reservoir of 61 meters height while the turbine is rotating at between 60 and 90 RPM. It was further observed that the pump was self priming. It is believed that with the combination of the shape of the buckets and the spread of water by the lips at the inlet the maximum torque is provided on shaft 15.

The embodiments illustrated in FIGS. 6, 7A and 7B provide increased pumping power over a single turbine where this is required. The operation is substantially the same as is illustrated in relation to FIGS. 1 to 5 except that the torque delivered from each turbine augments the others. It will be appreciated that the embodiment shown in FIGS. 7A and 7B may be employed in high rise buildings not only for storm water but also for such uses as sinks. The waste water can be recycled to reserve tanks on the roofs of buildings for use in automatic urinal flushing systems and toilet flushing systems or the like.

In the embodiment illustrated in FIG. 8 and the buckets are seen (when viewed in cross section) to have three blade portions. Inner blade portion 112 extends radially outwardly from the circumference 111 of a drum 110 carrying outer blade portion 114 and lip portion 116. When viewed in cross section, the construction of the bucket is completed by and discs 40.

In the embodiment illustrated the plane of portion 114 intersects a radial plane passing through blade portion 112 at an angle of 120°. Similarly the plane in which lip portion 226 lies intersects the plane in which outer portion 114 lies at an angle of 120°. These are preferred embodiments and other angles may be found to be appropriate for other circumstances. Outer blade portion 114 is wider than inner portion 112 or lip portion 116.

Inlet 12 empties water 38 onto curved bottom wall 56 of the throat of the turbine and water passes through slots 62 and 64 in the same manner as illustrated in FIG. 3. A curved portion 118 is cut into the back wall of the casing 10 to allow passage of the buckets as they rotate about axis 15.

Water intake 36 is illustrated in the bottom reservoir of the turbine. In another embodiment intake 36 is placed in a source of fresh clear water and inlet 12 is connected to a source of waste water so that the waste water can be used to pump the fresh water. The turbine is illustrated in FIG. 8 as sitting on a concrete pad 120.

In operation water flowing through inlet 12 passes through the slots 62 and 64 to enter the buckets as defined by drum surface 111, blade portions 112, 114, 116 and discs 40 to drive the turbine counter-clockwise as illustrated in FIG. 8.

Figure 11:
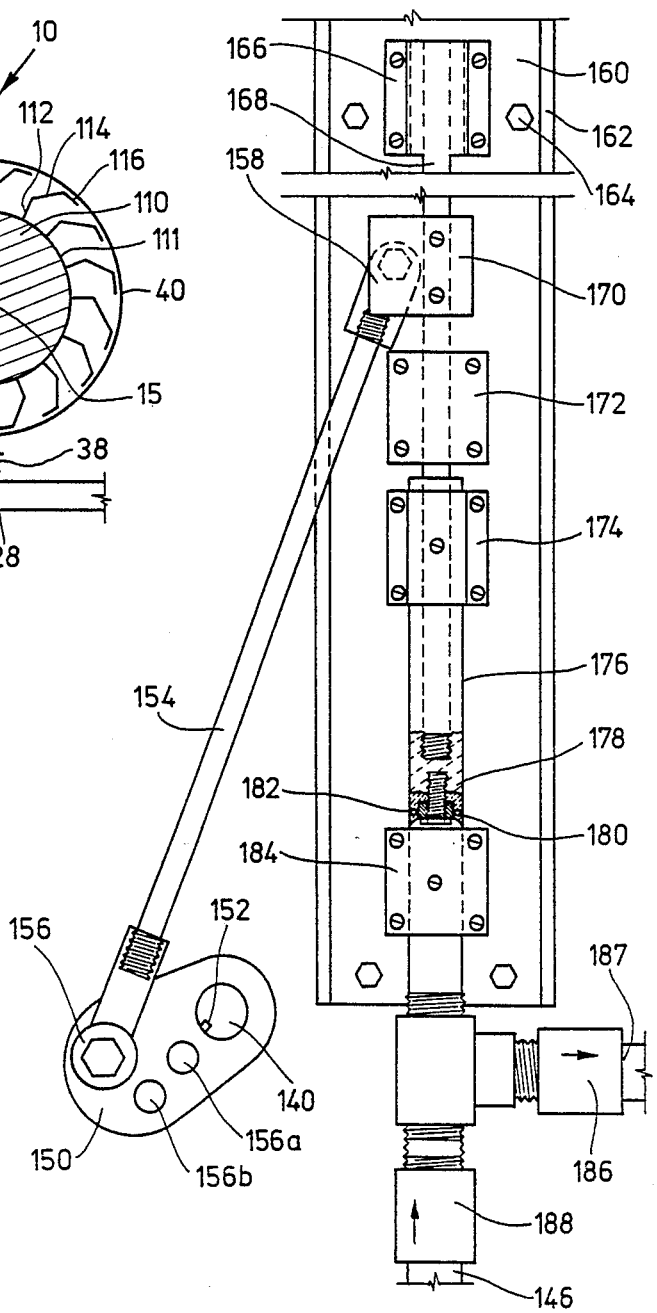
FIG. 11 is an end elevational view of a pump mounted on the turbine according to the invention.
Figure 9:
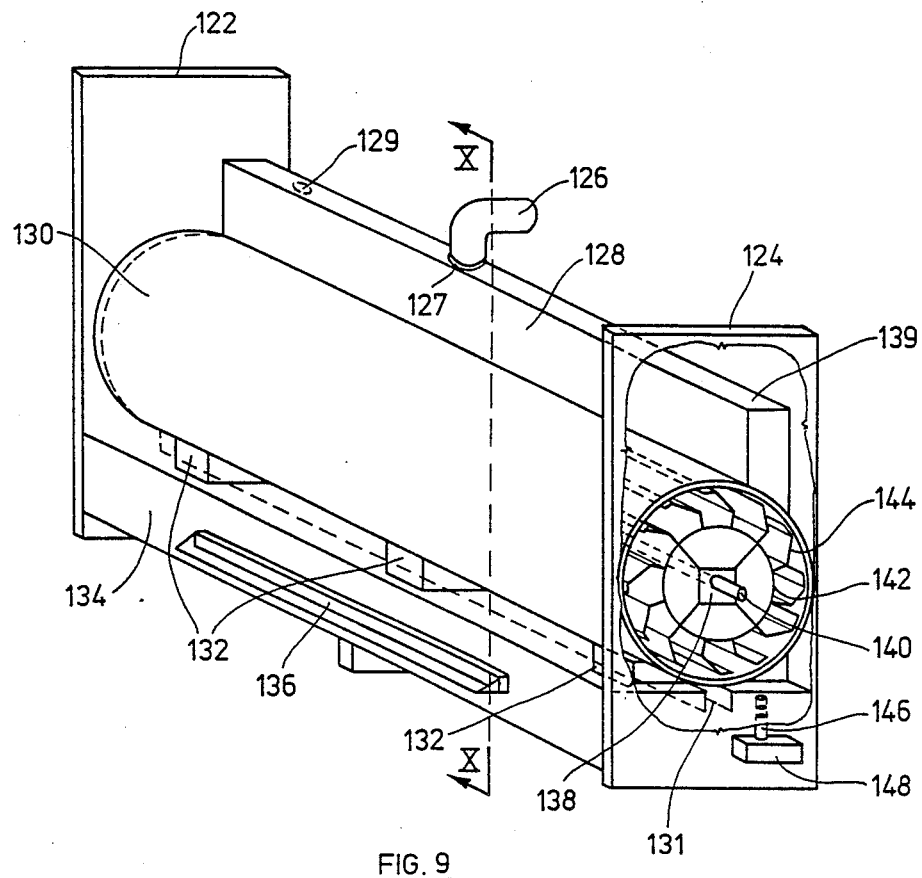
FIG. 9 is a perspective view of a further embodiment of the invention with part of the end cut away.
Figure 10:
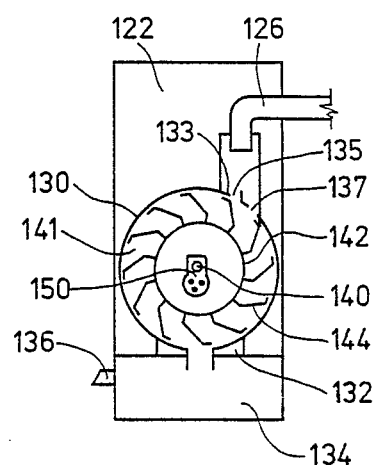
FIG. 10 is a cross sectional view taken along line X—X as shown in FIG. 9.

A further embodiment of the invention is illustrated in FIGS. 9, 10 and 11. This construction features a casing which is substantially cylindrical surrounding the buckets and a reciprocating pump driven by the turbine mounted so as to reduce the length of the priming pipe as compared to the other embodiment illustrated.

The construction comprises a pair of upright frames 122 and 124. The cylindrical casing 130 has an upright inlet manifold 128 and an outlet 131 feeding into a bottom reservoir 134. Inlet manifold 128 has three inlet holes 127, 129 and 139. In the embodiment illustrated an inlet pipe 126 feeds into inlet hole 127. Casing 130 sits on three blocks 132. Opening 136 in the form of a lip as illustrated extends from the side of the reservoir casing 134. Priming pipe 146 from the pipe leads into pump intake box 148. This box is separated by a baffle from the main body of the reservoir so as to minimise the presence of bubbles caused by cavitation within box 148. Shaft 140 is mounted in bearing block 138 which in turn is mounted on upright frame member 124.

In FIG. 10 crank disc 150 is illustrated mounted on the end of shaft 140. This crank is better illustrated in FIG. 11.

Referring to FIG. 10 the turbine comprises a drum 142 mounted by radial spokes (not illustrated) extending from drum 142. Each blade 144 consists of a radial inner portion, a main blade portion extending at an angle of approximately 120° from the inner blade portion and an outer lip again extending at an angle of approximately 120° from the main blade portion. In the embodiment illustrated the angle between adjacent inner portions of the blade is approximately 30°. Although the preferred blade configurations and angles are as illustrated it will be appreciated that a curved blade having a lip achieving the same retention of water may also be employed.

Within the manifold 128 at the bottom there is a spreader section 133 with two longitudinal openings 135 and 137 opening into the casing and into the mouth of buckets.

Referring to FIG. 11 a reciprocating pump for use with the turbine of the invention is illustrated. The pump is mounted on an aluminum channel 160 having upright lips 162 projecting therefrom. Four bolts 164 mount the channel onto an end frame member 124. A similr channel may be mounted on the outer face of upright frame member 122.

The pump consists of a barrel 176 extending from a bracket 174 to below bracket 184. Brackets 174 and 184 retain the barrel in the position illustrated. Piston rod 168 extends out the top of barrel 176 and through bearing blocks 172 and 166. Preferably these bearings are brass bearings. Within the guideway 178 in barrel 176 at the end of piston rod 168 there is provided a washer 180 and a brass guide 182. In a preferred embodiment the washer is a leather washer. A connecting member 170 is mounted with screws on piston rod 168. Crank disc 150 having a choice of three positions for the end 156 of connecting rod 154 is mounted on the end of shaft 140 by a key in a keyway 152. A knuckle joint 158 at the opposite end of connecting rod 154 joins the connecting rod 154 to the connecting member 170.

Priming pipe 146 extends downwardly from non-return valve 188 at the bottom of the pump barrel. To the right of the pump barrel a discharge pipe 187 extends out of a one way valve 186.

In operation water flowing into outlet pipe 126 is spread outwardly within the manifold 128 to pass through the openings 135 and 137 into the exposed bucket 144. As in the operation of the outer buckets the spreading of the water is effected evenly along substantially the length of the bucket from end to end between the end discs 141. Because of the particular configuration of the buckets a substantial amount of water is retained in each of them as the turbine is rotated in a clockwise direction past bottom dead center and emptying is not completed until the relative bucket has rotated above this position. Crank disc 150 is rotated on a shaft 140 by the water falling on the buckets raising connecting rod 154 and consequently piston rod 168 to draw water into the pump barrel on the upstroke opening the one way valve 188 while on the downstroke one way valve 188 is closed and water is discharged through one way valve 186 and discharge pipe 187. Excess water in reservoir 134 not pumped by the turbine is discharged out outlet 136.

Performance equal to or better than that described in relation to the earlier embodiments has been observed using the embodiments of FIGS. 9 to 11 inclusive.

As is disclosed in the prior art listed above turbines according to the present invention are not limited to use in driving pumps. They may be employed as power sources for generating electricity or as a source of mechanical power for applications previously made by conventional water wheels.

What is claimed is:

1. A substantially cylindrical water driven turbine, comprising:
   a central shaft;
   a drum co-axial and rotatable with said shaft;
   a plurality of buckets, each bucket being defined by the outer surface of said drum, an end disc extending radially outwardly at each end of said drum, and connecting radially inner and outer blade portions extending axially between each of said end discs and in a direction substantially radially outwardly from said drum, each bucket being adapted to delay discharge of water from said bucket during rotation of said drum until before but substantially close to bottom dead center;
   the diameter of said drum being substantially in the range of one half to three-quarters of the diameter of the circumference defined by the outer lips of said buckets;
   inlet means having an intake end which is relatively narrow to receive a flow of water and having an outlet end which is relatively wide to spread said flow horizontally and direct the water into each bucket substantially along the length of said bucket;
   the axial distance end to end of said drum being greater than the width of said intake end of said inlet means;

the water outlet end of said inlet means being provided with deflecting means to direct the flow of water in a substantially flat flow, said deflecting means comprising a discharge end having a deflecting lip thereon for deflecting the water in the direction extending substantially along the length of said buckets, and directing means to direct the flow of water from said deflecting lip at said discharge end inwardly toward the opening of each bucket;

the arrangement being such that in use said drum and shaft are rotated by said water falling into said buckets.

2. A turbine as claimed in claim 1 wherein said blade portions are substantially flat.

3. A turbine as claimed in claim 2 wherein each inner blade portion lies in a plane extending along a radius of said drum.

4. A turbine as claimed in claim 3 wherein each outer blade portion lies in a plane which intersects the plane of said inner blade at an angle of substantially 120°.

5. A turbine as claimed in claim 4 wherein a lip blade portion is provided at the radially outer edge of said outer blade portion, said lip blade portion extending axially between each of said end discs.

6. A turbine as claimed in claim 5 wherein the plane of said lip blade portion intersects the plane of said outer blade portion at an angle of substantially 120°.

7. A turbine as claimed in claim 6 wherein said outer blade portion is wider when viewed in end elevation than either of said inner blade portion and said lip blade portion.

8. A turbine as claimed in claim 5 wherein said outer blade portion is wider when viewed in end elevation than either of said inner blade portion and said lip blade portion.

9. A turbine as claimed in claim 7 wherein the planes of said inner blade portions extending radially from said drum intersect with each other at angles of substantially 30°.

10. A turbine as claimed in claim 1 wherein three said inlet means are provided in said turbine.

11. A turbine as claimed in claim 1 wherein at least one reciprocating pump is provided for pumping water, at least one end of said shaft is provided with a crank drivingly connected to said at least one reciprocating pump, a reservoir is provided near the discharge point for water driving said turbine, and an inlet for said at least one reciprocating pump is provided and connected to said reservoir so that the water source for said pump comprises said reservoir.

12. A turbine as claimed in claim 11 wherein the water in said reservoir is supplied by said discharge point.

13. A turbine as claimed in claim 1 wherein:
said directing means comprises at least one slot in said outlet end of said inlet means extending in said direction substantially along the length of said bucket.

14. A turbine as claimed in claim 13 wherein:
said deflecting means comprises a first curved section on said discharge end; and
said deflecting lip comprises a second curved section curved oppositely to the curvature of said first curved section.

15. A turbine as claimed in claim 1 wherein:
said deflecting means further comprises a first curved section on said discharge end; and
said deflecting lip comprises a second curved section curved oppositely to the curvature of said first curved section.

16. A turbine as claimed in claim 1 wherein the axial length of said drum is greater than the diameter of said drum.

* * * * *